United States Patent
Lu et al.

(10) Patent No.: US 10,782,674 B2
(45) Date of Patent: Sep. 22, 2020

(54) ELECTRONIC DEVICE AND WORK-FREQUENCY REDUCING METHOD THEREOF

(71) Applicant: PEGATRON CORPORATION, Taipei (TW)

(72) Inventors: Hung-Chi Lu, Taipei (TW); Kai-Hung Wang, Taipei (TW); Po-Yu Tsai, Taipei (TW); Yung-Han Hsiao, Taipei (TW); Cheng-Lun Chiang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 11 days.

(21) Appl. No.: 16/361,582

(22) Filed: Mar. 22, 2019

(65) Prior Publication Data

US 2019/0302740 A1 Oct. 3, 2019

(30) Foreign Application Priority Data

Apr. 3, 2018 (TW) .............................. 107111970 A

(51) Int. Cl.
*G05B 19/4155* (2006.01)
*G01C 9/00* (2006.01)
*G01L 1/00* (2006.01)

(52) U.S. Cl.
CPC ........... *G05B 19/4155* (2013.01); *G01C 9/00* (2013.01); *G01L 1/00* (2013.01); *G05B 2219/49204* (2013.01)

(58) Field of Classification Search
CPC ...... G05B 19/4155; G05B 2219/49204; G01C 9/00; G01L 1/00; G06F 1/166;
(Continued)

(56) References Cited

U.S. PATENT DOCUMENTS 9,024,892 B2 * 5/2015 Ting ................... G06F 3/04883
345/173
2014/0228649 A1 * 8/2014 Rayner ................ A61B 5/6898
600/301

(Continued)

FOREIGN PATENT DOCUMENTS

TW 201037488 A 10/2010
TW 201421220 A 6/2014

*Primary Examiner* — Ziaul Karim
(74) *Attorney, Agent, or Firm* — Muncy, Geissler, Olds & Lowe, P.C.

(57) ABSTRACT

An electronic device and a work-frequency reducing method thereof are disclosed. The electronic device at least includes a case, a gravity sensor, a pressure sensor and a processing unit. The gravity sensor detects the gravity status of the electronic device and outputs a plurality of gravity detecting signals. The pressure sensor detects the pressure status of the bottom portion of the case and outputs a plurality of pressure detecting signals. The work-frequency reducing method includes the following steps: receiving the gravity detecting signals and judging whether the variation value of the gravity detecting signals is greater than a default gravity value or not; if yes, decreasing the working frequency of the processing unit; receiving the pressure detecting signals and judging whether the pressure detecting signals are greater than a default pressure value or not; and if no, restoring the working frequency of the processing unit.

9 Claims, 5 Drawing Sheets

(58) Field of Classification Search
CPC ...... G06F 1/1656; G06F 1/1677; G06F 1/324;
G06F 1/3231; G06F 1/1694; G06F
1/1684; G06F 1/3215; G06F 1/3206;
G01D 21/02
See application file for complete search history.

(56) References Cited

U.S. PATENT DOCUMENTS

2017/0168465 A1\* 6/2017 Chen ................. G05B 13/0205
2020/0026900 A1\* 1/2020 Zhou ................. G06K 9/00013

\* cited by examiner

ELECTRONIC DEVICE AND WORK-FREQUENCY REDUCING METHOD THEREOF

CROSS REFERENCE TO RELATED APPLICATIONS

This Non-provisional application claims priority under 35 U.S.C. § 119(a) on Patent Application No(s). 107111970 filed in Taiwan, Republic of China on Apr. 3, 2018, the entire contents of which are hereby incorporated by reference.

BACKGROUND

Technology Field

The present disclosure relates to an electronic device and a work-frequency reducing method thereof. In particular, this disclosure relates to a portable electronic device containing a gravity sensor and a pressure sensor, and a work-frequency reducing method thereof based on the gravity sensor and the pressure sensor.

Related Art

Portable electronic devices, such as notebook computers and tablet computers, have become a popular electronic product because of their easy application in many different situations. For example, the notebook computer can be placed on the desktop or on the legs depending on the usage situation. However, after the notebook computer is used for a period of time, the temperature of the base of the notebook computer will rise. If the user puts the notebook computer on the legs, the user can feel the overheated base and be uncomfortable. Moreover, if the notebook computer is placed one the user's legs for a long time, it is possible to cause burns on the legs.

Therefore, it is an important subject to provide an electronic device that can detect the usage situation all the time, and automatically decrease or restore the working frequency of the processing unit of the electronic device according to the usage situation. This configuration can reduce the heat generated by the electronic device, thereby preventing the uncomfortable feeling and burns of the user caused by the high temperature of the electronic device.

SUMMARY

In view of the foregoing, an objective of this disclosure is to provide an electronic device and a work-frequency reducing method thereof. Compared with the conventional art, the electronic device of this disclosure comprises a gravity sensor and a pressure sensor, and the work-frequency reducing method is to adjust the working frequency of the processing unit of the electronic device according to the usage situation of the electronic device automatically detected by the gravity sensor and the pressure sensor. This design can prevent the uncomfortable feeling and burns of the user caused by the high temperature of the electronic device.

To achieve the above, the present disclosure provides a work-frequency reducing method of an electronic device. The electronic device at least comprises a case, a gravity sensor, a pressure sensor and a processing unit. The gravity sensor and the processing unit are disposed inside the case, and the pressure sensor is disposed at the bottom portion of the case. The processing unit is electrically connected with the gravity sensor and the pressure sensor. The gravity sensor is configured to detect the gravity status of the electronic device and to output a plurality of gravity detecting signals, and the pressure sensor is configured to detect a pressure status of the bottom portion of the case and to output a plurality of pressure detecting signals. The work-frequency reducing method comprises steps of: receiving the gravity detecting signals and judging whether a variation value of the gravity detecting signals is greater than a default gravity value or not; if the variation value of the gravity detecting signals is greater than the default gravity value, decreasing a working frequency of the processing unit; receiving the pressure detecting signals and judging whether the pressure detecting signals are greater than a default pressure value or not; and if the pressure detecting signals are not greater than the default pressure value in a preset period, restoring the working frequency of the processing unit.

In one embodiment, after the step of receiving the gravity detecting signals and judging whether a variation value of the gravity detecting signals is greater than the default gravity value or not, the work-frequency reducing method further comprises steps of: if the variation value of the gravity detecting signals is not greater than the default gravity value, receiving the pressure detecting signals and judging whether the pressure detecting signals are greater than the default pressure value or not; and if the pressure detecting signals are greater than the default pressure value, decreasing the working frequency of the processing unit.

In one embodiment, the preset period is between 1 minute and 5 minutes.

In one embodiment, the default gravity value is greater than 0 G and less than 1 G.

In one embodiment, the default pressure value is between 50 g/cm$^2$ and 500 g/cm$^2$.

In one embodiment, the step of decreasing the working frequency of the processing unit is to immediately, slowly or stepwisely decrease the working frequency of the processing unit to a default working frequency.

To achieve the above, the present disclosure also provides an electronic device comprising a case, a gravity sensor, a pressure sensor, a computer readable storage medium, and a processing unit. The gravity sensor is disposed inside the case. The pressure sensor is disposed at a bottom portion of the case. The computer readable storage medium is disposed inside the case and stores a plurality of program codes. The processing unit is disposed inside the case. The processing unit is electrically connected with the gravity sensor and the pressure sensor and coupled with the storage medium. The processing unit is configured for executing the program codes to perform the above-mentioned work-frequency reducing method.

In one embodiment, the case further comprises at least one pad disposed at the bottom portion of the case, and the pressure sensor is disposed inside the at least one pad or between adjacent two of the pads.

In one embodiment, the pressure sensor is disposed between adjacent two of the pads in a point arrangement, a linear arrangement, or a planar arrangement.

In one embodiment, the pressure sensor is disposed at the bottom portion of the case in a point arrangement, a linear arrangement, or a planar arrangement.

As mentioned above, the electronic device and the work-frequency reducing method thereof of this disclosure utilize the gravity sensor and the pressure sensor to detect the usage situation of the electronic device, and decrease or restore the working frequency of the processing unit of the electronic device according to the usage situation, thereby automatically adjusting the working frequency of the processing unit according to the usage situation. This design can prevent the uncomfortable feeling and burns of the user caused by the high temperature of the electronic device, which is, for example, placed on the legs of the user. In addition, when the electronic device is placed on the desktop, the working frequency of the processing unit can be restored so as to enhance the performance of the processing unit. Moreover, this disclosure utilizes the pressure sensor and the gravity sensor to automatically detect the usage situation of the electronic device, the detection accuracy can be improved. This configuration can prevent the misjudgment by utilizing a single gravity sensor or a single pressure sensor.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE EMBODIMENT

The present disclosure will be apparent from the following detailed description, which proceeds with reference to the accompanying drawings, wherein the same references relate to the same elements.

Figure 1:
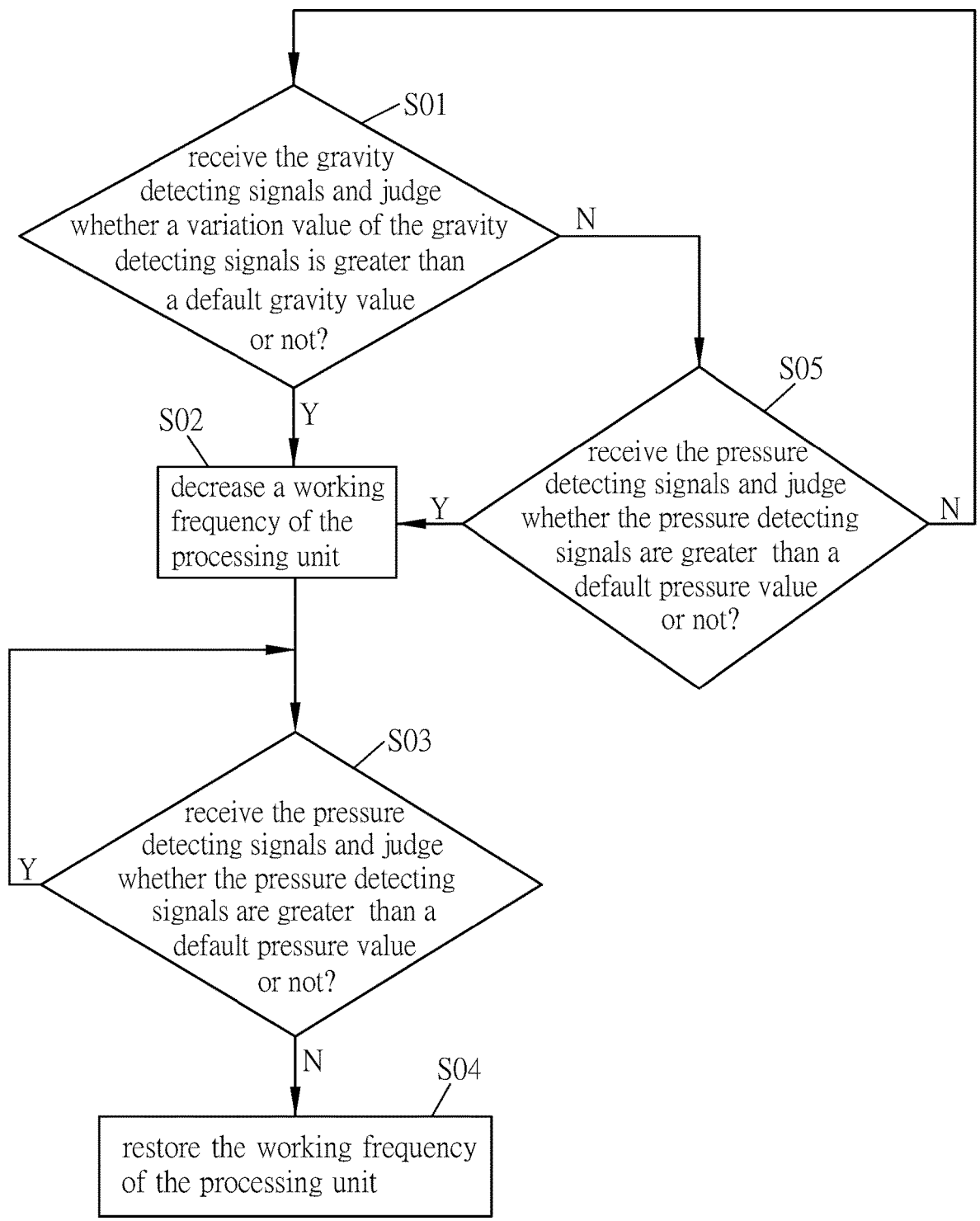
FIG. 1 is a flow chart showing a work-frequency reducing method of an electronic device according to an embodiment of this disclosure.

FIG. 1 is a flow chart showing a work-frequency reducing method of an electronic device according to an embodiment of this disclosure. Referring to FIG. 1, the electronic device at least comprises a case, a gravity sensor, a pressure sensor and a processing unit. The gravity sensor and the processing unit are disposed inside the case, and the pressure sensor is disposed at the bottom portion of the case. The processing unit is electrically connected with the gravity sensor and the pressure sensor. The gravity sensor is configured to detect the gravity status of the electronic device and to output a plurality of gravity detecting signals. The pressure sensor is configured to detect a pressure status of the bottom portion of the case and to output a plurality of pressure detecting signals. The work-frequency reducing method comprises steps of: receiving the gravity detecting signals and judging whether a variation value of the gravity detecting signals is greater than a default gravity value or not (step S01); if the variation value of the gravity detecting signals is greater than the default gravity value, decreasing a working frequency of the processing unit (step S02); receiving the pressure detecting signals and judging whether the pressure detecting signals are greater than a default pressure value or not (step S03); and if the pressure detecting signals are not greater than the default pressure value in a preset period, restoring the working frequency of the processing unit (step S04).

In this embodiment, the gravity sensor detects a gravity status of the electronic device and outputs a plurality of gravity detecting signals. Specifically, the gravity sensor periodically detects the gravity status of the electronic device and then outputs a plurality of gravity detecting signals. Preferably, the time interval of the periodical detection is between 10 ms and 500 ms. Preferably, the time interval of the periodical detection is between 30 ms and 300 ms. Preferably, the time interval of the periodical detection is between 50 ms and 150 ms. Preferably, the time interval of the periodical detection is 100 ms.

In this embodiment, the pressure sensor detects a pressure status of a bottom portion of the case and outputs a plurality of pressure detecting signals. Specifically, the pressure sensor periodically detects the pressure status of the bottom portion of the case and then outputs a plurality of pressure detecting signals. Preferably, the time interval of the periodical detection is between 10 ms and 500 ms. Preferably, the time interval of the periodical detection is between 30 ms and 300 ms. Preferably, the time interval of the periodical detection is between 50 ms and 150 ms. Preferably, the time interval of the periodical detection is 100 ms.

In this embodiment, the step S01 is to receive the gravity detecting signals and judging whether a variation value of the gravity detecting signals is greater than a default gravity value or not, and the step S02 is to decrease a working frequency of the processing unit. The step S02 will decrease the working frequency of the processing unit based on the judgment result of the step S01. If the variation value of the gravity detecting signals is greater than the default gravity value, the judgment result of the step S01 is "Yes", and then the step S02 is performed to decrease the working frequency of the processing unit. In more detailed, the processing unit receives a plurality of gravity detecting signals from the gravity sensor and calculates the variation value of the gravity detecting signals. Then, the processing unit compares the variation value of the gravity detecting signals with a default gravity value so as to judge whether the variation value of the gravity detecting signals is greater than the default gravity value or not. If the variation value of the gravity detecting signals is greater than the default gravity value, the step S02 is performed to decrease the working frequency of the processing unit. In this embodiment, the processing unit calculates with two consequent gravity detecting signals with a time interval to obtain the variation value of the gravity detecting signals. When the working frequency of the processing unit is decreased, the heat generated by the processing unit can be reduced, thereby decreasing the temperature of the processing unit. For example, when the user takes the electronic device off the desktop or moves the electronic device onto the legs, the gravity detecting signals will be changed. When the variation value of the gravity detecting signals is greater than the default gravity value, the working frequency of the processing unit is decreased so as to reduce the generated heat. This configuration can prevent the uncomfortable feeling of the user caused by the high temperature of the electronic device.

In this embodiment, the step S03 is to receive the pressure detecting signals and judge whether the pressure detecting signals are greater than a default pressure value or not, and the step S04 is to restore the working frequency of the processing unit. The step S04 will restore the working frequency of the processing unit based on the judgment result of the step S03. If the pressure detecting signals are not greater than the default pressure value, the judgment result of the step S03 is "No", and then the step S04 is performed to restore the working frequency of the processing unit. If the pressure detecting signals are greater than the default pressure value, the judgment result of the step S03 is "Yes", and then the working frequency of the processing unit is not restored. Afterwards, the step of judging the pressure detecting signals (step S03) will be repeated. In more detailed, the processing unit receives a plurality of pressure detecting signals from the pressure sensor and compares the pressure detecting signals with a default pressure value so as to judge whether the pressure detecting signals are greater than the default pressure value or not. If the pressure detecting signals are not greater than the default pressure value in a preset period, the step S04 is performed to restore the working frequency of the processing unit. If the pressure detecting signals are greater than the default pressure value, the working frequency of the processing unit is not restored. For example, when the variation value of the gravity detecting signals is greater than the default gravity value, the working frequency of the processing unit is decreased to reduce the generated heat (step S02), and the step S03 and step S04 will be performed later for determining whether the electronic device is moved onto the legs of the user or not. When the user moves the electronic device onto the legs, the bottom portion of the case of the electronic device will be pressure, so that the pressure detecting signals will be greater than the default pressure value. In this case, the working frequency of the processing unit is not restored. Alternatively, if the user puts the electronic device on the desktop, the bottom portion of the case of the electronic device is not pressure, so that the pressure detecting signals are not greater than the default pressure value. In this case, the working frequency of the processing unit will be restored. In other words, the pressure sensor is configured to determine the current usage status of the electronic device. This configuration can prevent the misjudgment by utilizing a single gravity sensor.

Another work-frequency reducing method of an electronic device according to a second embodiment of this disclosure will be described hereinafter with reference to FIG. 1. The configurations of the electronic device of the second embodiment are the same as those of the previous embodiment, so the details thereof will be omitted. In the second embodiment, the work-frequency reducing method comprises the steps S01 to S04 of the previous embodiment and further comprises the following steps of: if the variation value of the gravity detecting signals is not greater than the default gravity value, receiving the pressure detecting signals and judging whether the pressure detecting signals are greater than the default pressure value or not (step S05); and if the pressure detecting signals are greater than the default pressure value, decreasing the working frequency of the processing unit (step S02).

In this embodiment, the step S05 is performed after the step S01. The step S01 is to receive the gravity detecting signals and judging whether the variation value of the gravity detecting signals is greater than the default gravity value or not. If the variation value of the gravity detecting signals is not greater than the default gravity value, the step S05 is performed to receive the pressure detecting signals and judge whether the pressure detecting signals are greater than the default pressure value or not. In more detailed, the processing unit receives a plurality of gravity detecting signals from the gravity sensor and calculates the variation value of the gravity detecting signals. Then, the processing unit compares the variation value of the gravity detecting signals with a default gravity value so as to judge whether the variation value of the gravity detecting signals is greater than the default gravity value or not. If the variation value of the gravity detecting signals is not greater than the default gravity value (the judgment result is "No"), the step S05 is performed to receive the pressure detecting signals and judge whether the pressure detecting signals are greater than the default pressure value or not.

In this embodiment, the step S05 is to receive the pressure detecting signals and judge whether the pressure detecting signals are greater than a default pressure value or not. If the pressure detecting signals are greater than the default pressure value, the step S02 is performed to decrease the working frequency of the processing unit. In more detailed, the processing unit receives a plurality of pressure detecting signals from the pressure sensor. When the pressure detecting signals are greater than the default pressure value, the judgment result is "Yes", and then the step S02 is performed to decrease the working frequency of the processing unit. To decrease the working frequency of the processing unit can reduce the heat generated by the processing unit, thereby decreasing the temperature of the processing unit. For example, when the user moves the electronic device onto the legs stably, the variation value of the gravity detecting signals may be not greater than the default gravity value. However, the electronic device is indeed placed on the legs of the user. Accordingly, the step S05 is needed to determine the actual usage status of the electronic device. If the user puts the electronic device on the legs, the bottom portion of the case of the electronic device will be pressure, so that the pressure detecting signals will be greater than the default pressure value. In this case, the working frequency of the processing unit is decreased. In this embodiment, the pressure sensor can be configured to determine the actual usage status of the electronic device. This configuration can prevent the misjudgment by utilizing a single gravity sensor.

In the above embodiments, the preset period is between 1 minute and 5 minutes. Preferably, the preset period is between 2 minutes and 4 minutes. More preferably, the preset period is 3 minutes.

In the above embodiments, the default gravity value is greater than 0 G and less than 1 G. Preferably, the default gravity value is greater than 0.01 G and less than 0.5 G. Preferably, the default gravity value is greater than 0.02 G and less than 0.3 G. Preferably, the default gravity value is greater than 0.03 G and less than 0.1 G. Preferably, the default gravity value is greater than 0.05 G and less than 0.06 G. More preferably, the default gravity value is 0.058 G.

In the above embodiments, the default pressure value is between 50 g/cm$^2$ and 500 g/cm$^2$. Preferably, the default pressure value is between 70 g/cm$^2$ and 400 g/cm$^2$. Preferably, the default pressure value is between 100 g/cm$^2$ and 300 g/cm$^2$. Preferably, the default pressure value is between 150 g/cm$^2$ and 250 g/cm$^2$. More preferably, the default pressure value is 200 g/cm$^2$.

In the above embodiments, the step of decreasing the working frequency of the processing unit is to immediately, slowly or stepwisely decrease a default working frequency to a preset working frequency to a preset working frequency. For example, the working frequency can be immediately decreased to the default working frequency or be stepwisely decreased to multiple intermediate working frequencies between the original working frequency and the default working frequency within a period of time and finally decreased to the default working frequency. The default working frequency can be ½, ⅔ or ⅘ of the original working frequency depending on the required minimum working frequency of different electronic devices, and this disclosure is not limited. In addition, the working frequency of the processing unit can be, for example, the operation power.

Figure 2:
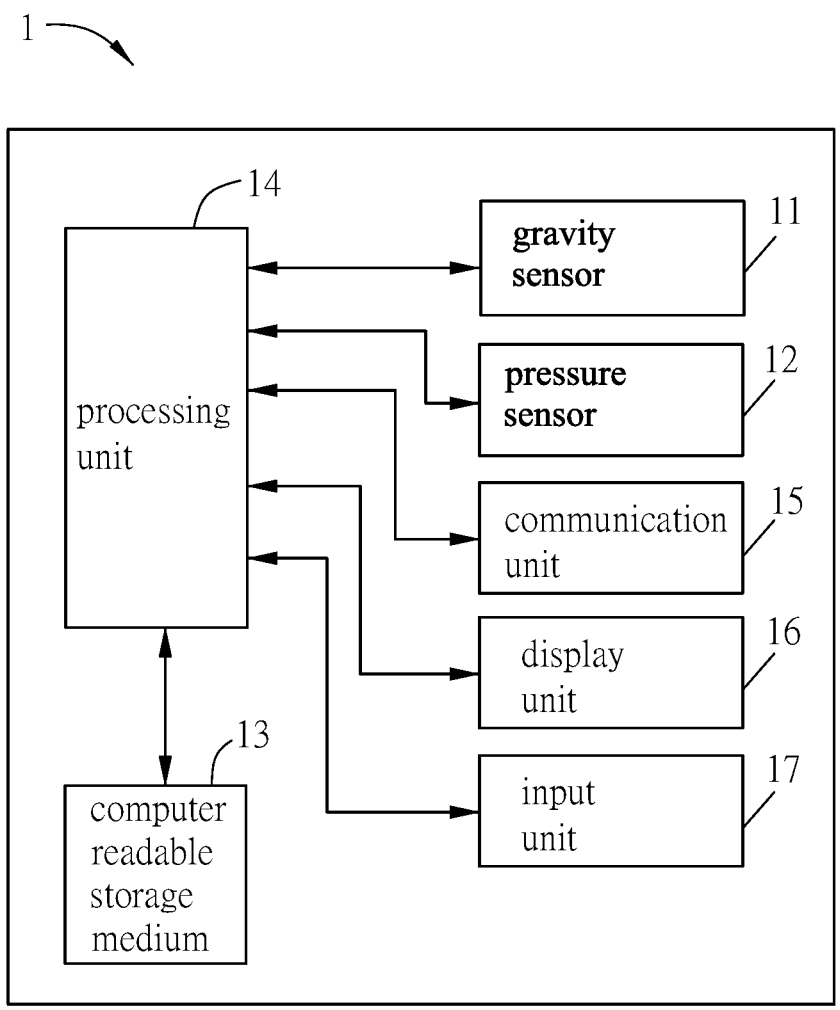
FIG. 2 is a schematic diagram showing an electronic device according to an embodiment of this disclosure.

FIG. 2 is a schematic diagram showing an electronic device according to an embodiment of this disclosure. The electronic device 1 comprises a case (not shown), a gravity sensor 11, a pressure sensor 12, a computer readable storage medium 13, and a processing unit 14. The gravity sensor 11 is disposed inside the case. The pressure sensor 12 is disposed at a bottom portion of the case. The computer readable storage medium 13 is disposed inside the case and stores a plurality of program codes. The processing unit 14 is disposed inside the case. The processing unit 14 is electrically connected with the gravity sensor 11 and the pressure sensor 12 and coupled with the storage medium 13. The processing unit 14 is configured for executing the program codes to perform the above-mentioned work-frequency reducing method.

For example, the electronic device 1 can be a notebook computer or any of other portable electronic devices. The electronic device 1 can further comprise a communication unit 15, a display unit 16, and an input unit 17. The communication unit 15 is disposed inside the case of the electronic device 1, and the display unit 16 and the input unit 17 are installed on the case.

The gravity sensor 11 can detect the direction of gravity in the three-dimensional space. For example, the gravity sensor 11 can measure the angle between the X, Y or Z axis and the gravity line in the three-dimensional space, thereby detecting the gravity detecting value. The unit of the gravity detecting value is the gravity acceleration value (G). The gravity sensor 11 is also referred to as an acceleration sensor, such as a capacitive acceleration sensor, a piezoelectric acceleration sensor, a piezoresistive acceleration sensor, a magnetoresistive acceleration sensor, or other accelerations, and this disclosure is not limited. The gravity sensor 11 can be placed anywhere within the case, and the disclosure is not limited. For example, the gravity sensor 11 periodically detects the gravity status of the electronic device with a time interval. When the user moves the electronic device, the angle between the X, Y, or Z axis of the electronic device and the gravity line changes, thereby changing the gravity detecting value. Then, the gravity sensor outputs the detected gravity detecting signals to the processing unit, and the processing unit receives the gravity detecting signals and judges whether the variation value of the gravity detecting signals is greater than the default gravity value. If the variation value of the gravity detecting signals is greater than the default gravity value, the working frequency of the processing unit is decreased. In this embodiment, the details of the time interval, the gravity detecting signals, the variation value, the default gravity value and the working frequency of the processing unit can be referred to the above embodiments, so the detailed description thereof will be omitted.

The pressure sensor 12 can directly detect the pressure. For example, the pressure sensor 12 can measure the pressure situation so as to obtain the pressure detecting value. The unit of the pressure detecting value is the $g/cm^2$. The pressure sensor 12 can be, for example, a resistive pressure sensor, an inductive pressure sensor, a capacitive pressure sensor, a piezoresistive pressure sensor, a piezoresistive strain gauge pressure sensor, semiconductor strain gauge pressure sensor, or other pressure sensing device, and the disclosure is not limited. The pressure sensor can be disposed on the inner surface or outer surface of the bottom portion of the case, and this disclosure is not limited. For example, the pressure sensor 11 periodically detects the pressure status of the bottom portion of the electronic device with a time interval. The pressure sensor outputs the detected pressure detecting signals to the processing unit, and the processing unit receives the pressure detecting signals and judges whether the pressure detecting signals are greater than the default pressure value. If the pressure detecting signals are not greater than the default pressure value within a preset period, which means that the pressure sensor has misjudgment and the electronic device is actually not placed on the legs, the working frequency of the processing unit is restored. Alternatively, in the case of not decreasing the working frequency of the processing unit, if the pressure detecting signals are greater than the default pressure value, which also means that the pressure sensor has misjudgment and the electronic device is actually placed on the legs, the working frequency of the processing unit is decreased. In this embodiment, the details of the time interval, the pressure detecting signals, the default pressure value, the preset period and the working frequency of the processing unit can be referred to the above embodiments, so the detailed description thereof will be omitted.

The processing unit 14 is coupled with the computer readable storage medium 13, the communication unit 15, the display unit 16 and the input unit 17, and is electrically connected with the gravity sensor 11 and the pressure sensor 12. The processing unit 14 is configured for executing the program codes (e.g. instructions) to perform the above-mentioned work-frequency reducing method. The processing unit 14 is, for example, a processor that can execute the program codes (e.g. instructions). The electronic device 1 can comprise one or more processors, and the processor can have a single core or multiple cores. The computer readable storage medium 13 includes a random access memory or a non-volatile computer readable storage medium. The non-volatile computer readable storage medium is, for example, a hard disk, a solid state drive (SSD), or a flash memory, which can store the program codes (e.g. instructions) to be executed by the processor. The processing unit 14 can load the program code (e.g. instructions) from a non-volatile computer readable storage medium into a random access memory and execute the loaded program code (instructions). The communication unit 15 is, for example, a network card, a network chip, a modem, or the likes that can provide network connection. The display unit 16 includes a display card, a display chip, a display, or the likes. The input unit 17 is, for example, a keyboard, a mouse, a touch screen, or the likes.

Figure 3A:
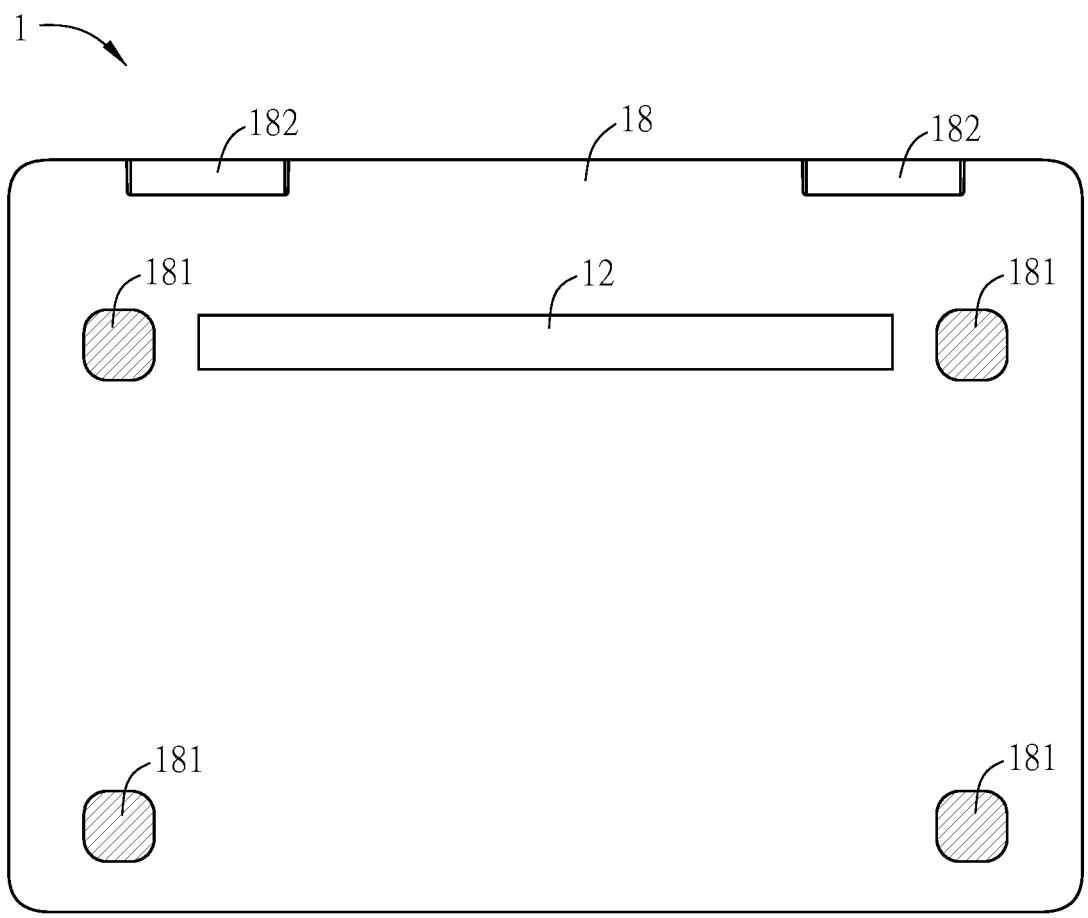
FIGS. 3A to 3C are schematic diagrams showing different configurations of the pressure sensors in the electronic device according to the embodiment of this disclosure.
Figure 3B:
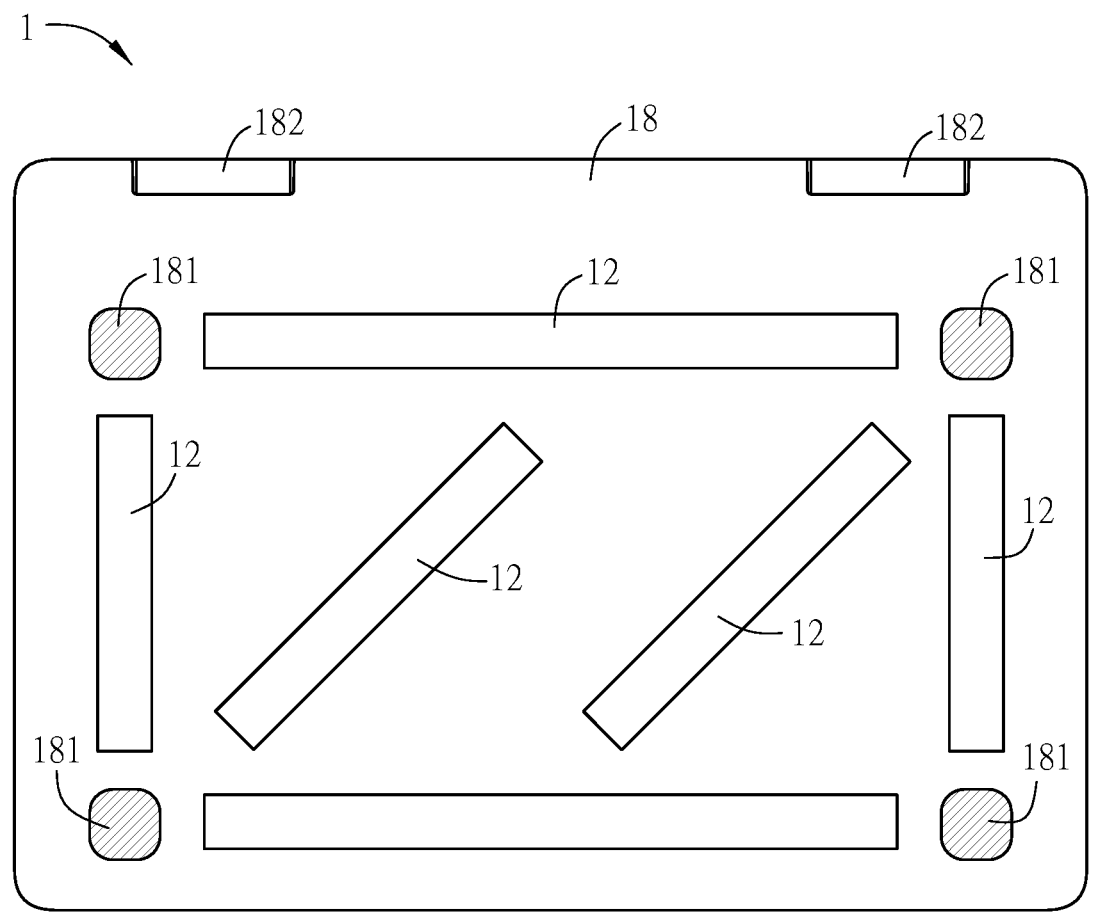
Figure 3C:
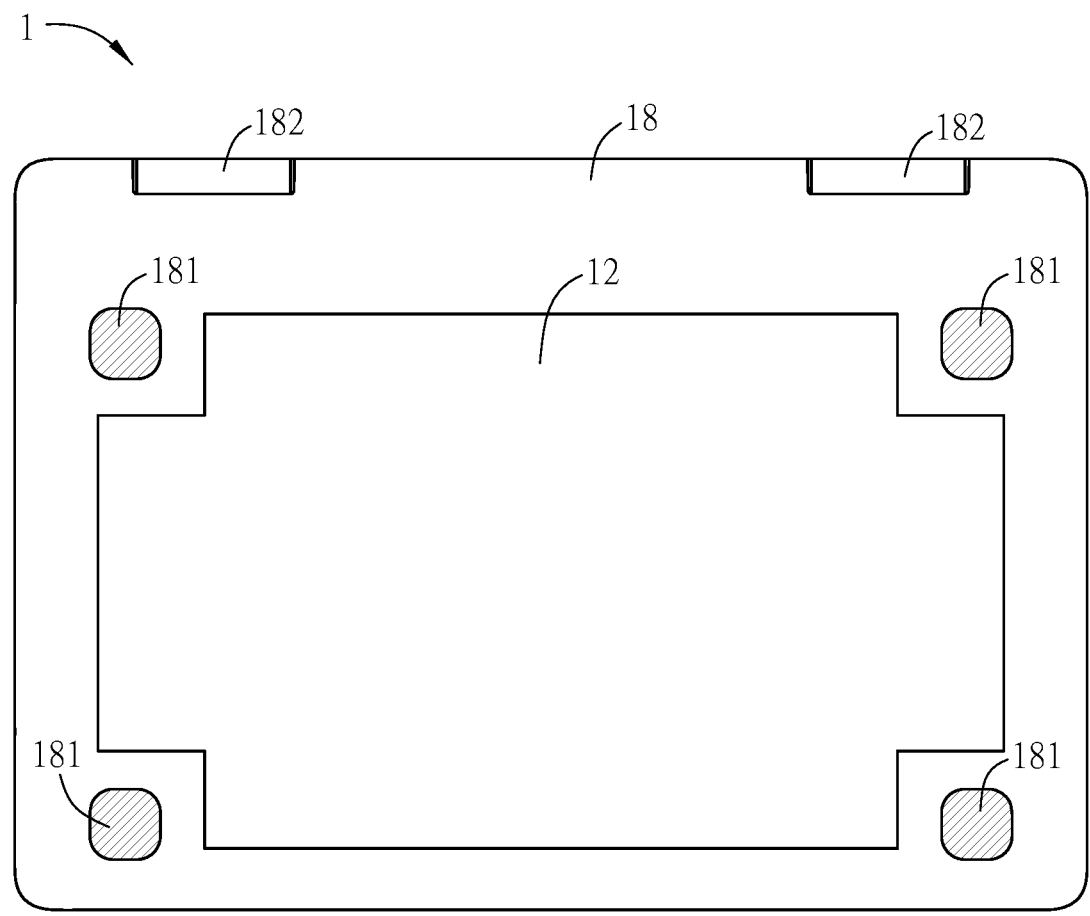

FIGS. 3A to 3C are schematic diagrams showing different configurations of the pressure sensors in the electronic device according to the embodiment of this disclosure. FIGS. 3A to 3C show the bottom views of the bottom portions of the electronic device in different configurations. The bottom portion of the case 18 of the electronic device 1 is further configured with at least pad 181. As shown in FIGS. 3A to 3C, four pads are disposed on the bottom portion of the case 18. To be noted, the amount of the pads 181 is not limited to four in this disclosure. In addition, the case 18 further comprises one or more connection portions 182. Taking a notebook computer as an example, the connection portions 182 are configured to connect a case for accommodating the display unit and a case for accommodating the input unit.

As shown in FIG. 3A, the pressure sensor 12 is disposed between two pads 181 closing to the connection portions 182 in a linear arrangement. For example, when the notebook computer is opened, the user can place the notebook computer on the desktop or the legs for operation, and the pressure sensor 12 will be located at one side of the notebook computer away from the user. The pressure sensor 12 can be disposed on the inner surface or the outer surface of the bottom portion of the case, and this disclosure is not limited.

As shown in FIG. 3B, the pressure sensors 12 are disposed between any two of the pads 181 in a linear arrangement. For example, the electronic device 1 comprises a plurality of pressure sensors 12, and the pressure sensors 12 are disposed between any two of the pads 181, respectively, for increasing the accuracy of the pressure detection. The pressure sensors 12 can be disposed on the inner surface or the outer surface of the bottom portion of the case, and this disclosure is not limited.

As shown in FIG. 3C, the pressure sensors 12 are disposed between four pads 181 in a planar arrangement. The pressure sensors 12 can be disposed on the inner surface or the outer surface of the bottom portion of the case, and this disclosure is not limited.

The configurations of the pressure sensors as shown in FIGS. 3A to 3C are for illustrations only and are not to limit this disclosure. In another embodiment, the pressure sensor (s) 12 can be disposed inside at least one pad 181. In addition, the pressure sensor 12 can be disposed at the bottom portion of the case in a point arrangement (not shown). Alternatively, the case of the electronic device of this disclosure may be not configured with the pad, and the pressure sensor(s) can be disposed on the inner surface or the outer surface of the bottom portion of the case in a point arrangement, a linear arrangement, or a planar arrangement.

In summary, the electronic device and the work-frequency reducing method thereof of this disclosure utilize the gravity sensor and the pressure sensor to detect the usage situation of the electronic device, and decrease or restore the working frequency of the processing unit of the electronic device according to the usage situation, thereby automatically adjusting the working frequency of the processing unit according to the usage situation. This design can prevent the uncomfortable feeling and burns of the user caused by the high temperature of the electronic device, which is, for example, placed on the legs of the user. In addition, when the electronic device is placed on the desktop, the working frequency of the processing unit can be restored so as to enhance the performance of the processing unit. Moreover, this disclosure utilizes the pressure sensor and the gravity sensor to automatically detect the usage situation of the electronic device, the detection accuracy can be improved. This configuration can prevent the misjudgment by utilizing a single gravity sensor or a single pressure sensor.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A work-frequency reducing method of an electronic device, wherein the electronic device at least comprises a case, a gravity sensor, a pressure sensor and a processing unit, the gravity sensor detects a gravity status of the electronic device and outputs a plurality of gravity detecting signals, and the pressure sensor detects a pressure status of a bottom portion of the case and outputs a plurality of pressure detecting signals, the work-frequency reducing method comprising steps of:

receiving the gravity detecting signals and judging whether a variation value of the gravity detecting signals is greater than a default gravity value or not;
if the variation value of the gravity detecting signals is greater than the default gravity value, decreasing a working frequency of the processing unit;
receiving the pressure detecting signals and judging whether the pressure detecting signals are greater than a default pressure value or not;
if the pressure detecting signals are not greater than the default pressure value in a preset period, restoring the working frequency of the processing unit; and
after the step of receiving the gravity detecting signals and judging whether the variation value of the gravity detecting signals is greater than the default gravity value or not, further comprising steps of:
if the variation value of the gravity detecting signals is not greater than the default gravity value, receiving the pressure detecting signals and judging whether the pressure detecting signals are greater than the default pressure value or not; and
if the pressure detecting signals are greater than the default pressure value, decreasing the working frequency of the processing unit.

2. The work-frequency reducing method according to claim 1, wherein the preset period is any time ranging between 1 minute and 5 minutes.

3. The work-frequency reducing method according to claim 1, wherein the default gravity value is greater than 0 G (gravitational acceleration) and less than 1 G (gravitational acceleration).

4. The work-frequency reducing method according to claim 1, wherein the default pressure value is between 50 g/cm2 and 500 g/cm2.

5. The work-frequency reducing method according to claim 1, wherein the step of decreasing the working frequency of the processing unit is to immediately, slowly or step wisely decrease the working frequency of the processing unit to a default working frequency.

6. An electronic device, comprising: a case; a gravity sensor disposed inside the case; a pressure sensor disposed at a bottom portion of the case; a non-transitory computer readable storage medium disposed inside the case and storing a plurality of program codes; and a processing unit disposed inside the case, wherein the processing unit is electrically connected with the gravity sensor and the pressure sensor and coupled with the computer readable storage medium, and the processing unit is configured for executing the program codes to perform the work-frequency reducing method of claim 1.

7. The electronic device according to claim 6, wherein the case further comprises: at least one pad disposed at the bottom portion of the case, wherein the pressure sensor is disposed inside the at least one pad or between adjacent two of the pads.

8. The electronic device according to claim 7, wherein the pressure sensor is disposed between adjacent two of the pads in a point arrangement, a linear arrangement, or a planar arrangement.

9. The electronic device according to claim 6, wherein the pressure sensor is disposed at the bottom portion of the case in a point arrangement, a linear arrangement, or a planar arrangement.

* * * * *